United States Patent
Guertler et al.

(10) Patent No.: US 10,757,573 B2
(45) Date of Patent: Aug. 25, 2020

(54) METHOD AND SYSTEM FOR AUTHENTICATING A USER

(71) Applicant: FINPIN TECHNOLOGIES GMBH, Vienna (AT)

(72) Inventors: Markus Guertler, Gaaden (AT); Alexander Koppel, Perchtoldsdorf (AT); Florian Randa, Vienna (AT)

(73) Assignee: FINPIN TECHNOLOGIES GMBH, Vienna (AT)

( * ) Notice: Subject to any disclaimer, the term of this patent is extended or adjusted under 35 U.S.C. 154(b) by 36 days.

(21) Appl. No.: 15/324,637

(22) PCT Filed: Jul. 7, 2015

(86) PCT No.: PCT/EP2015/065458
§ 371 (c)(1),
(2) Date: Jan. 6, 2017

(87) PCT Pub. No.: WO2016/005377
PCT Pub. Date: Jan. 14, 2016

(65) Prior Publication Data
US 2017/0208464 A1    Jul. 20, 2017

(30) Foreign Application Priority Data
Jul. 7, 2014   (EP) .................................... 14176007

(51) Int. Cl.
*H04W 12/06*     (2009.01)
*G06Q 20/40*     (2012.01)
(Continued)

(52) U.S. Cl.
CPC ............... *H04W 12/06* (2013.01); *G01S 5/02* (2013.01); *G06Q 20/02* (2013.01);
(Continued)

(58) Field of Classification Search
CPC . H04W 12/06; H04W 12/04; H04W 12/0403; H04W 12/0401; H04W 12/0609;
(Continued)

(56) References Cited

U.S. PATENT DOCUMENTS 7,447,784 B2    11/2008  Eun
7,697,920 B1 *   4/2010  McClain ................. G06F 21/43
                                                    455/410

(Continued)

FOREIGN PATENT DOCUMENTS

| EP | 1102150 A2 | 5/2001 |
| WO | WO 2010004576 A1 | 1/2010 |
| WO | WO 2012123727 A1 | 9/2012 |

OTHER PUBLICATIONS

ISA European Patent Office, International Search Report Issued in Application No. PCT/EP2015/065458, dated Oct. 8, 2015, WIPO, 6 pages.

(Continued)

*Primary Examiner* — Fred A Casca
(74) *Attorney, Agent, or Firm* — McCoy Russell LLP (57) ABSTRACT

The invention relates to a method and system for authenticating a user, wherein an application transmits a query comprising identification data to an authentication service, the authentication service determines the address of a mobile terminal linked to the user on the basis of the identification data and transmits a request comprising a transaction identifier to the mobile terminal, the mobile terminal performs an enquiry for input of a biometric security feature, grants access to a private key saved on the mobile terminal upon input of a valid security feature, signs the transaction identifier using the private key and transmits the signed transaction identifier back to the authentication service, and the authentication service verifies the signature of the signed (Continued)

transaction identifier and, in the case of the presence of an authentic signature, transmits a confirmation of the query back to the application.

18 Claims, 5 Drawing Sheets

(51) Int. Cl.
| | |
|---|---|
| G06Q 20/02 | (2012.01) |
| G06Q 20/42 | (2012.01) |
| G06Q 20/32 | (2012.01) |
| H04B 17/318 | (2015.01) |
| H04B 7/0417 | (2017.01) |
| H04B 7/06 | (2006.01) |
| H04B 7/0413 | (2017.01) |
| H04B 10/112 | (2013.01) |
| H04B 17/373 | (2015.01) |
| H04B 17/391 | (2015.01) |
| G01S 5/02 | (2010.01) |
| H04W 16/14 | (2009.01) |
| H04W 16/18 | (2009.01) |
| H04W 16/22 | (2009.01) |
| H04L 1/06 | (2006.01) |
| H04L 29/06 | (2006.01) |

(52) U.S. Cl.
CPC ... *G06Q 20/3227* (2013.01); *G06Q 20/40145* (2013.01); *G06Q 20/42* (2013.01); *H04B 7/0413* (2013.01); *H04B 7/0417* (2013.01); *H04B 7/0617* (2013.01); *H04B 7/0619* (2013.01); *H04B 7/0634* (2013.01); *H04B 10/112* (2013.01); *H04B 17/318* (2015.01); *H04B 17/373* (2015.01); *H04B 17/3911* (2015.01); *H04L 1/06* (2013.01); *H04L 63/0861* (2013.01); *H04W 16/14* (2013.01); *H04W 16/18* (2013.01); *H04W 16/22* (2013.01); *G06Q 2220/00* (2013.01)

(58) Field of Classification Search
CPC .. G06Q 20/02; G06Q 20/322; G06Q 20/3227; G06Q 20/3829; G06Q 20/40145; G06Q 20/42; G06Q 2220/00; H04L 63/0861; H04L 63/0884; H04L 63/0853
See application file for complete search history.

(56) References Cited

U.S. PATENT DOCUMENTS

| | | | |
|---|---|---|---|
| 2002/0095587 A1* | 7/2002 | Doyle | G06Q 20/341 713/186 |
| 2003/0061163 A1 | 3/2003 | Durfield | |
| 2004/0148356 A1* | 7/2004 | Bishop, Jr. | H04L 51/38 709/206 |
| 2009/0287599 A1 | 11/2009 | Lamar, III et al. | |
| 2010/0267362 A1 | 10/2010 | Smith et al. | |
| 2011/0022484 A1 | 1/2011 | Smith et al. | |
| 2011/0099379 A1* | 4/2011 | Ganesan | H04L 9/0822 713/175 |
| 2011/0126017 A1* | 5/2011 | Blom | H04L 63/06 713/171 |
| 2011/0219230 A1* | 9/2011 | Oberheide | H04L 9/32 713/168 |

OTHER PUBLICATIONS

International Bureau of WIPO, International Preliminary Report on Patentability Issued in Application No. PCT/EP2015/065458, dated Jan. 19, 2017, WIPO, 8 pages.

* cited by examiner

METHOD AND SYSTEM FOR AUTHENTICATING A USER

CROSS-REFERENCE TO RELATED APPLICATIONS

The present application is a U.S. National Phase of International Patent Application Serial No. PCT/EP2015/065458, entitled "METHOD AND SYSTEM FOR AUTHENTICATING A USER," filed on Jul. 7, 2015. International Patent Application Serial No. PCT/EP2015/065458 claims priority to European Patent Application No. 14176007.4, filed on Jul. 7, 2014. The entire contents of each of the above-cited applications are hereby incorporated by reference for all purposes.

TECHNICAL FIELD

The invention relates to a method and a system for authenticating a user by means of an authentication service as well as a mobile terminal connected thereto.

BACKGROUND AND SUMMARY

The invention relates in particular to a method and a system which make available the safety and the user friendliness of a biometric authentication of users via a generic interface to Internet applications (i.e. to almost any applications, provided they are connected to the Internet) which, inherently, do not have a local biometric authentication at their disposal. A starting point for the invention is the continuously increasing widespread use of biometric readers which, in the meantime, are increasingly employed even in smart phones. In general, however, at present biometric authentication in correspondingly equipped mobile terminals is used only for local applications, for instance in order to control the access to the terminal itself. It is typical for such local applications that the authentication process is initiated at the terminal, i.e., as a result of an interaction with the mobile terminal itself the user is requested to input a biometric security feature (wherein also said input itself can be used as an initial interaction, for instance when unlocking a device). External applications are not granted a direct access from the outside to the biometric readers—also because of safety reasons—so that such applications still have to rely on other authentication mechanisms, as for instance the input of a password. In order to be able to use a biometric authentication, it would be necessary to relocate the applications at least in part to the terminal so that at least the authentication steps could be performed locally. This, however, means a comparatively high expenditure for the individual applications which—considering the diverse terminals which, for the most part, are not (yet) equipped with suitable installations—is hardly economically viable.

Such a method is for instance shown in EP 1 102 150 A2, wherein the method shown therein has some shortcomings, as it is not possible to confirm certain transactions, but it is only possible to identify the user in general. In this case, the authentication method is not transparent for the shown application, as the address of the mobile terminal is determined by the application or has to be known to the application so that the application can initiate an authentication. Accordingly, a direct trust has to be established also between the application and the mobile terminal (e.g. by a corresponding key exchange). Moreover, it cannot be inferred from EP 1 102 150 A2 how an identification by means of a fingerprint is used for an authentication with respect to the application.

The invention is based on the idea to make available the possibility of a biometric authentication via an authentication service which is virtually used as an intermediary agent, wherein the linkage to the authentication service can preferably be effected via authentication interfaces and protocols already widely spread for other purposes. The connection of an existing application to such an authentication service is realizable in a comparatively simple way, and, in many cases, it is already present for other authentication services.

Basically, such central authentication services which facilitate the authentication of a user via a mobile terminal for external applications have also already been known. For instance, US 2003/0061163 A1 shows a method in which credit card transactions can be confirmed or approved in real time via a mobile terminal, wherein the payment will only be concluded after the approval. In the course of this method, the owner of the credit card, with which a payment was made at a merchant, is contacted via a central agency and is requested to confirm the transaction or to deny it.

Also U.S. Pat. No. 7,447,784 B2 describes a method and a system for authenticating an Internet user, wherein for instance in case of a purchase on a website or in case of an application the identity of the user is verified via an authentication service of a cellular phone service provider or a cellular network operator, wherein the authentication server sends an authentication query to the cellular phone of the user who has to reply to said authentication request with a password for approval.

In the method described in WO 2010/004576 A1, the input of a PIN by the user and the transmittal thereof (of the PIN) back to the authentication server is provided, i.e. no authentication of the user is carried out at the terminal, but the terminal serves only as an input device in the course of the authentication of the user for an authentication performed at the authentication server.

Also US 2011/0022484 A1, US 2010/0267362 A1 and US 2009/0287599 A1 each show methods in which no authentication of the user at the terminal is carried out.

In the method known from WO 2012/123727 A1 either also the input authentication feature is transmitted to a server and said server makes the authentication decision, with the disadvantage that—in particular in case of biometric security features—the deposit of security features at the server leads to data protection problems; or the terminal makes the authentication decision locally and only informs the server of the result, so that no longer any authentication is carried out at the server, with the disadvantage that the server has to fully trust the authentication at the terminal.

It is an object of the invention to propose a method or a system which makes available the advantages of a biometric authentication to an external application, and, at the same time, avoids the disadvantages which are connected in particular with the initial set-up of such a method—which is necessary for a secure authentication—between the application and the mobile terminal (and, thus, significantly reduce the acceptance of such methods and systems).

Said object is solved according to the invention in a method of the kind as mentioned at the beginning by the fact that an application transmits a query comprising identification data to an authentication service, the authentication service determines the address of a mobile terminal linked to the user on the basis of the identification data (wherein in this context any information by means of which it is possible to get into contact with the mobile terminal is regarded as an address, e.g. an IP address, a telephone number, a hardware address or comparable data) and transmits a request comprising a transaction identifier to the mobile terminal, the mobile terminal (or an authentication application installed in the mobile terminal) performs an enquiry for input of a biometric security feature, grants access to a private key saved on the mobile terminal upon input of a valid security feature, signs the transaction identifier using the private key and transmits the signed transaction identifier back to the authentication service, and the authentication service verifies the signature of the signed transaction identifier and, in the case of the presence of an authentic signature, transmits a confirmation of the query back to the application. Accordingly, the above object is solved according the invention in a system of the kind mentioned at the beginning—the system comprising an authentication server which hosts an authentication service, and a mobile terminal which is configured to communicate with the authentication server, wherein the authentication server comprises a memory containing identification data for identifying the user and an address of the mobile terminal linked with the identification data, wherein the mobile terminal is configured to verify or check a biometric security feature and comprises a memory containing a private key protected by a biometric security feature—by the fact that the mobile terminal is configured to perform an enquiry for input of a biometric security feature upon receipt of a request comprising a transaction identifier from the authentication service, to grant the access to the private key upon input of an authorized security feature, to sign the transaction identifier using the private key and to transmit the signed transaction identifier back to the authentication service. Thus, the authentication service forms a central point of contact for the authentication of the registered users, wherein the mobile terminals used for the authentication itself and the process flow of the biometric authentication are transparent (i.e. not visible) for the accessing application. The application has to be coupled with the authentication service just once, or a mutual trust or confidence has to be established just once. Then subsequent authentications can be initiated preferably by an initial communication of the application with the authentication server. As a matter of course, the authentication service remains coupled to each mobile terminal or to the biometric reader; it is, however, sufficient to perform said process only once for any number of external applications. In particular, the processing stages explained above, which are carried out on the mobile terminal, can be implemented by an authentication application installed in the mobile terminal so that a mobile terminal can also be equipped subsequently by retrofitting (e.g. downloading) the authentication application for the present method. The identification data used by the authentication service for the determination of the mobile terminal to be contacted can either identify a user, so that the mobile terminals registered by said user can be determined, or they can point in another manner to the mobile terminal allocated to the user. The biometric security feature may be a fingerprint, an iris scan, a face recognition or a DNA analysis, wherein, in some cases, the number of authentication attempts and the time intervals between the attempts can be limited in order to make a bypass of the authentication more difficult and in order to increase the safety of the method altogether. In order to inform the user, in addition to the temporal correlation (the transaction is usually triggered by the user himself/herself within the frame of the external application), of the fact why an authentication is necessary, an authentication reason, e.g. a description of the transaction, may be transmitted to the mobile terminal besides the transaction identifier and can be displayed to the user together with the enquiry of the security feature. Furthermore, upon receipt of the confirmation of the query the application can transmit or display to the user a message about the effected approval, wherein the notification can also be effected implicitly only by the grant of access to a secured part of the application.

The authentication method can be used practically any time and, thus, universally, when the authentication service is connected with the mobile terminal via a mobile (i.e. wireless, long-range) data connection, e.g. 3G, UMTS, LTE or comparable technologies. Preferably, also the querying application is connected via a TCP/IP connection for the initialization of the communication with the authentication server. Practically any mobile data connection enabling a communication via a TCP/IP connection between the mobile terminal and the authentication service can be employed. In this manner, also everyday authentication procedures, as for instance when ordering a film on a set top box, at a cash machine or automatic teller machine, in bank transactions at the bank counter, when shopping or purchasing, or in case of access controls, can be carried out by applying the present authentication method.

In order to establish the equivalence of the method with a direct or local biometric authentication, it is beneficial if the access to the private key will only be granted after input of an authorized biometric security feature. This means that the private key at the mobile terminal is exclusively reserved for the purpose of the biometric authentication. In this connection, the attributes (length, period of validity, used algorithm) of the private key should be chosen such that the safety of the authentication is thereby identical to or approximately identical to the safety of a direct biometric authentication.

In order to be able to clearly identify the terminal by means of which the authentication was carried out, and to be able to check or verify whether it is the mobile terminal determined for the purpose of authentication, corresponding to the identification data, and being contacted by the authentication service, it is advantageous if the authentication service verifies the signed transaction identifier with a public key which is linked with the identification data and is deposited in the memory of the authentication server. Correspondingly, such a verification is successful when the transaction identifier was signed with that private key which corresponds to the deposited public key. If another terminal than the contacted terminal had signed the transaction identifier, the verification would fail even when the signature is verifiable with another, possibly even registered public key or even when the signature can be decoded therewith.

Furthermore, it is also favorable if the authentication service signs the confirmation using a user-independent private key. The confirmation would be signed correspondingly prior to the transmittal back to the application. In this manner it can be prevented that the confirmation permits conclusions with respect to the user or the mobile terminal which go beyond the identification data. In particular, the confirmation does not contain any signature or other characteristic features which could be attributable to the user or the mobile terminal, apart from those that are already contained in the identification data and, inevitably, are known to the application anyway. Thereby, private data of the user, e.g. in which time periods which mobile terminal is used, how often the user changes the mobile terminal or the like, are protected by the authentication service and hidden from the accessing applications.

Moreover, it has turned out to be particularly advantageous if, together with the transaction identifier, a transaction characteristic modifiable by the user at a mobile terminal is transmitted, and, together with the signed transaction identifier, a corresponding, possibly modified transaction characteristic is transmitted. In this connection, the transaction characteristic can comprise any data associated with the query or the transaction identifier. While the transaction identifier preferably is distinct or even unique in order to avoid a confusion of different transactions in the authentication service, the transaction characteristic can take up arbitrary values. In particular, they can be data and values which characterize the transaction so that the authentication can be used e.g. as a conditional approval of a transaction specified in more detail by the transaction characteristic. Accordingly, a value of the transaction characteristic confirmed by the authentication, in particular by taking into consideration possible modifications carried out at the mobile terminal, will be forwarded together with the confirmation to the application. For instance, an approved amount of payment in a payment transaction, or the duration of an approval in case of a service, or the duration of a temporary authorization can be assigned to a transaction as a transaction characteristic. Thus, when an approved amount of payment is transmitted, it is possible that by the authentication only a part of a total transaction amount is approved, and then, subsequently, on the part of the application it can be attempted to obtain an approval for the remainder of the total transaction amount in another way, e.g via a further user linked with the transaction, whose identification data are known. In this manner, for instance joint bills can be shared by several participants and can be partly paid by each participant. While the transaction identifier is preferably generated and allocated by the authentication service, the transaction characteristic is determined or at least initialized by the application and possibly modified by the mobile terminal.

In particular for safety-critical transactions or in order to verify a consensus between several authorized parties, it is furthermore particularly advantageous if the authentication service determines the addresses of at least two mobile terminals on the basis of the identification data and transmits a request comprising a transaction identifier to the at least two mobile terminals, wherein a confirmation of the query will only be transmitted to the application when an authentically signed transaction identifier has been received from all terminals. Thus, for instance, a verification or checking of a transaction according to the dual control principle, i.e. two (or more) users have to release or enable the transaction, can be realized when the identification data are linked correspondingly with at least two users. In this case, the at least two mobile terminals are each linked to the different users. It is, however, also possible to additionally protect a multiple biometric authentication of an individual user in this manner, when the at least two mobile terminals are linked to the same user and verify different biometric security features, e.g. a fingerprint as well as a face recognition. Analogously, it is also conceivable that two different users are requested one after the other to input a respective biometric security feature on the same mobile terminal.

In connection with such a multiple authentication it is advantageous if the authentication service observes a verification sequence, wherein a transaction identifier authentically signed by a first mobile terminal is transmitted to a second mobile terminal, and wherein a confirmation of the query will be transmitted only when a transaction identifier authentically signed by all mobile terminals is present. In this way, the process flow of the authentication can be defined beforehand, and there can be realized for instance an incremental approval (i.e. an approval at stages). In case of a plurality of unauthorized queries, for instance, a preselection can be delegated so that the last authentication in the verification sequence will only be initiated if the corresponding transaction has already been released or authorized in a single-stage or multi-stage preselection.

In order that the application can perform the authentication without any adaption of the query and thus without a change of the application also after a change of the mobile terminal or in case of the use of several mobile terminals, it is favorable if the identification data comprise a user identifier registered at the authentication service by the user and being independent of the address of the mobile terminal. Thus, the user identifier is practically representative of one or several mobile terminals of the user or of at least one user for which the biometric authentication is performed in the end. Thus, if the user uses another or an additional mobile terminal, he/she is able to just inform the authentication service thereof in a simple manner, whereupon immediately all applications accessing the authentication service can make use of the new terminal and can profit therefrom.

In order to avoid a manipulation of the authentication method or at least to make it more difficult, it is advantageous if, for the initialization of the authentication method, the private key is generated at the mobile terminal and is coupled with an authorized biometric security feature. The private key is preferably stored in a secured memory of the mobile terminal and shall never leave the mobile terminal. Correspondingly, a key pair is generated internally in the mobile terminal, and only the public key of the key pair is transmitted to the authentication service. In order to avoid a counterfeiting of the authentication by an illegal transmission of the private key, an IMEI (International Mobile Equipment Identity) of the mobile terminal can be used as a part of the key. The IMEI or a comparable identification feature of the mobile terminal can for instance be attached to a randomly generated key or can be put in front of the key.

For the protection of the authentication method and for the avoidance of a fraudulent use of a stolen mobile terminal by third parties, it is favorable when, for the termination of the authentication method, the authentication service transmits an erase instruction to the mobile terminal, and the mobile terminal erases the private key permanently upon receipt of the erase instruction. Thereby it is impossible to further create valid signatures for transaction identifiers with the mobile terminal, and thereby the mobile terminal is unsuitable for future authentications.

BRIEF DESCRIPTION OF THE FIGURES

In the following, the invention will be further explained by means of particularly preferred embodiments, without, however, being limited thereto, and by reference to the drawings in which.

DETAILED DESCRIPTION

Figure 1:
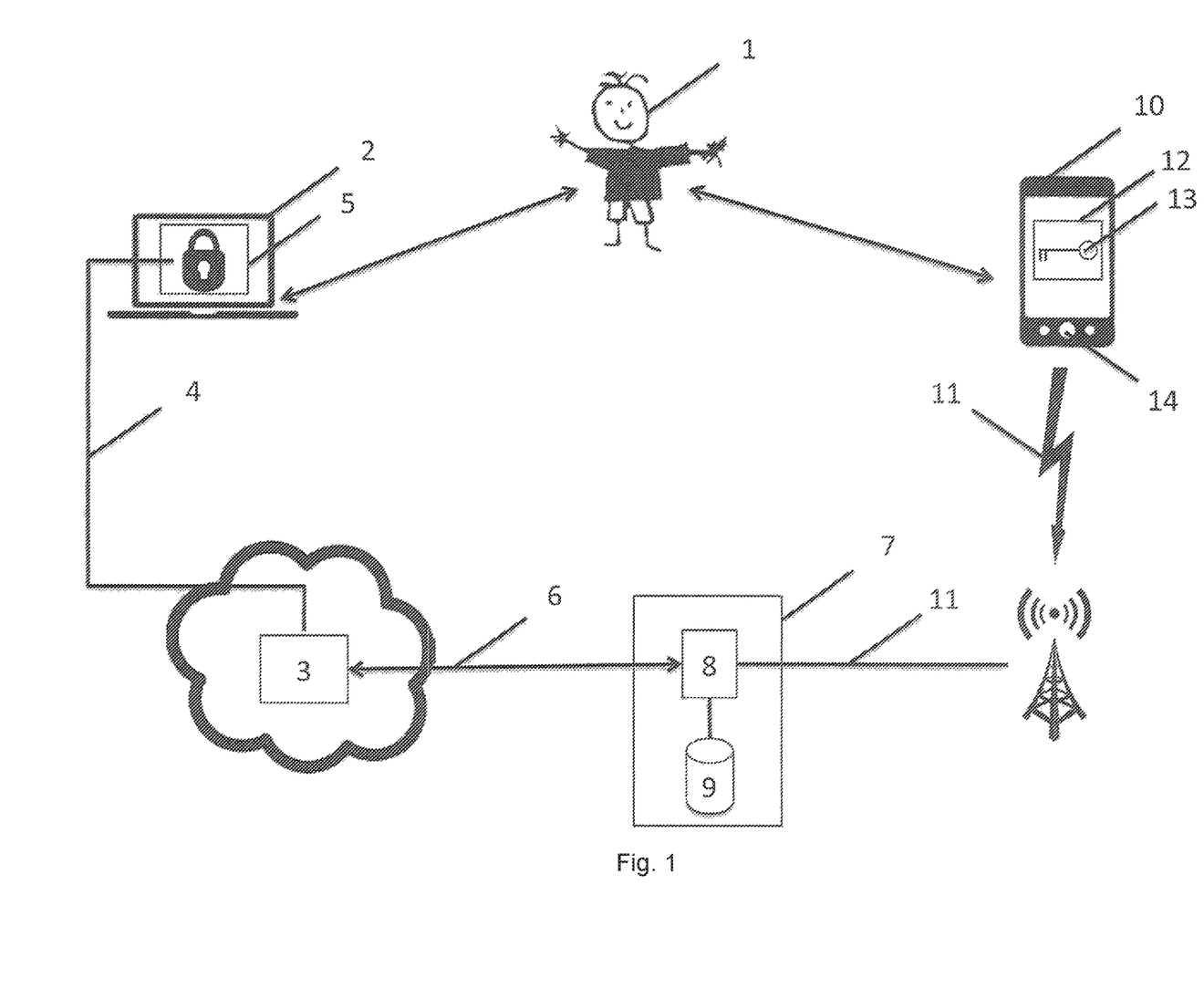
FIG. 1 shows a use case with one user authenticating himself/herself on a mobile terminal for the access to an application.

In the embodiment represented in FIG. 1, a user 1 accesses an application 3 via a notebook 2. In this case, the application 3 is an Internet application the user interface of which is indicated or executed in the form of a client 5 on the notebook 1, the client 5 being connected with the application 3 via a data connection 4. Parts of the application 3 are access-protected and require an authentication of an authorized user. In the situation as represented in FIG. 1, the user 1 accesses such an access-protected part of the application 3. Thereupon, the application 3 establishes a data connection 6 with an authentication service 8 running on an authentication server 7 and transmits to the authentication service 8 a query which comprises at least identification data of the user 1. Thereupon the authentication service 8 generates first of all a unique transaction identifier which is linked with the query. The authentication service 8 is connected with a memory 9 of the authentication server 7, said memory 9 being managed in the form of a database. The database comprises a collection of registered users, wherein to each user preferably at least one mobile terminal is linked. I.e., the database includes a table with associations between the users and the addresses of the respectively linked mobile terminals. Thus, by means of the received identification data, the authentication service 8 can determine the addresses of those mobile terminals which are associated with the user 1 indicated by the identification data. If no corresponding address can be found, the authentication fails, and the application 3 will be informed accordingly. If at least one address of a mobile terminal 10 is found, the authentication service 8 establishes a data connection 11 with the mobile terminal 10 and transmits a request comprising the previously generated transaction identifier via said data connection to the mobile terminal 10. The mobile terminal 10 comprises a memory 12 in which a private key 13 is stored. Furthermore, the mobile terminal 10 comprises a reading device 14 for a biometric security feature, in particular a fingerprint reader. The access to the private key 13 stored locally in the mobile terminal 10, or rather in its memory 12, is protected in this connection by a biometric security feature of the user 1 which can be input via the also local reading device 14 which is preferably integrated in the mobile terminal 10, i.e. the access to the private key 13 will only by granted by and after the input of an authorized biometric security feature at the reading device 14. When the mobile terminal 10 receives the request from the authentication service 8, it performs an enquiry for input of a biometric security feature of the user 1 at the reading device 14, i.e. the user 1 is notified by the mobile terminal 10, e.g. in the form of an audio signal and/or a vibration signal, that an authentication is pending and that the input of a biometric security feature is required for the approval. Accordingly, the enquiry is triggered by the application 3 practically by remote control and in general without any interaction of the user with the mobile terminal 10. As soon as the user 1 complies with the enquiry and enters an authorized biometric security feature, first the access to the private key 13 will be granted locally, as already explained. The result of the user input itself, i.e. the entered biometric security feature, is only used for the control of the access to the private key and will by no means be transmitted from the mobile terminal 10 to the outside, in particular also not to the authentication service 8. Using the now accessible private key 13, the transaction identifier received from the authentication service 8 will be signed in the mobile terminal 10. In this connection, for instance the transaction identifier itself or a hash of the transaction identifier will be encoded using the private key 13, and the result will be appended as a signature to the transaction identifier. The signed transaction identifier will then be transmitted back to the authentication service 8. In the memory 9 of the authentication service 8 the public key (not shown) corresponding with the private key 13 is stored, which is now used for the verification of the signature. In this connection, the signature is decoded using the public key, and the result will be compared with the transaction identifier or with its hash. If the comparison is successful, i.e. if a correspondence is determined, the signature is to be regarded as authentic, and the authentication service 8 transmits a positive confirmation of the query back to the application 3. In order to additionally protect the verification, public keys associated with the addresses of the mobile terminals 10 can be stored in the memory 9, by means of which not only the authenticity of the signature but also its origin, i.e. the identity of the mobile terminal 10 issuing the signature, can be verified. Furthermore, the authentication service 8 can provide the confirmation with an own, user-independent (or global) signature which is created with a private key of the authentication service 8 stored at the authentication server 7. The application 3 can verify the signature of the confirmation with a single public key, namely that of the authentication service 8. As soon as the application 3 receives a positive and preferably signed confirmation from the authentication service 8, it can release or grant the access to the secured part of the application 3.

Figure 2:
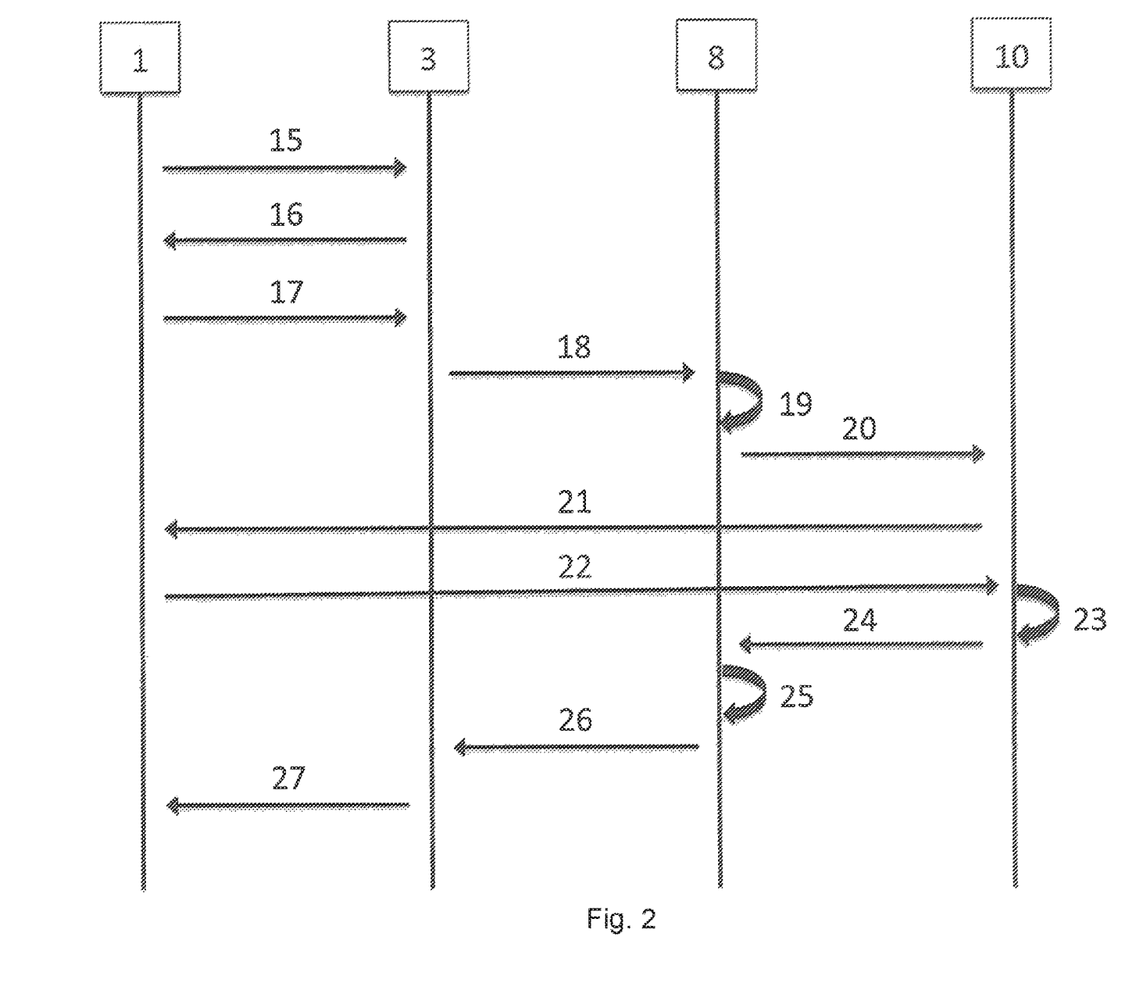
FIG. 2 shows a schematic sequence diagram for the process flow of an authentication in the use case represented in FIG. 1.

FIG. 2 represents the above already roughly described process flow once again in detail. In this connection, first of all the user 1 will request access to a secured part of the application 3 (step 15). The application 3 responds to the request 15 with an enquiry 16 of a user identification. After input 17 of the user identification, the application 3 transmits a query 18 comprising the corresponding identification data to the authentication service 8. The authentication service 8 locally performs a database query 19 of the addresses of the mobile terminals associated with the identification data and generates a transaction identifier allocated to the query 18. Then the authentication service 8 transmits a request 20 comprising the generated transaction identifier to at least one mobile terminal 10 which can be reached by the found addresses. At the mobile terminal 10, which receives the request 20, an enquiry 21 of the user 1 is performed for the input of a biometric security feature. As soon as the user has executed an input 22 of the enquired biometric security feature, access to a locally stored private key 13 will be granted at the mobile terminal 10, and, using the private key 13, at least the transaction identifier received from the authentication service 8 will be signed (step 23). Then there follows the transmittal 24 of the signed transaction identifier from the mobile terminal 10 to the authentication service 8. The latter performs a verification 25 of the signature and, in case of a positive result of the verification 25, transmits a confirmation 26 of the query or of the successful authentication back to the application 3. Finally, the application 3 transmits a notification 27 about the effected approval to the user 1, wherein the notification can also be effected implicitly only by the grant of access to a secured part of the application 3.

Figure 3:
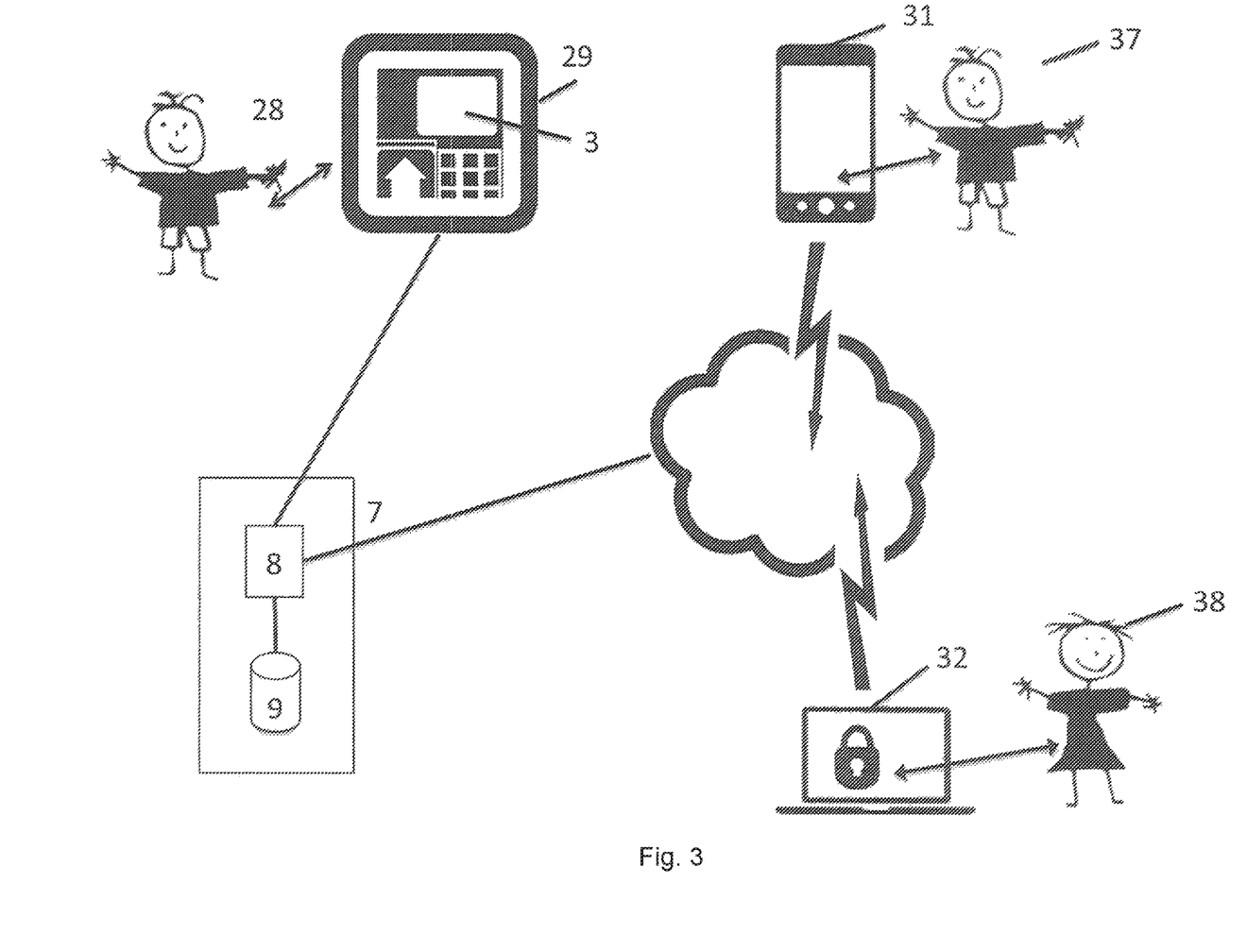
FIG. 3 shows another use case with three users, wherein two users authenticate the access of a third user to an application.
Figure 4:
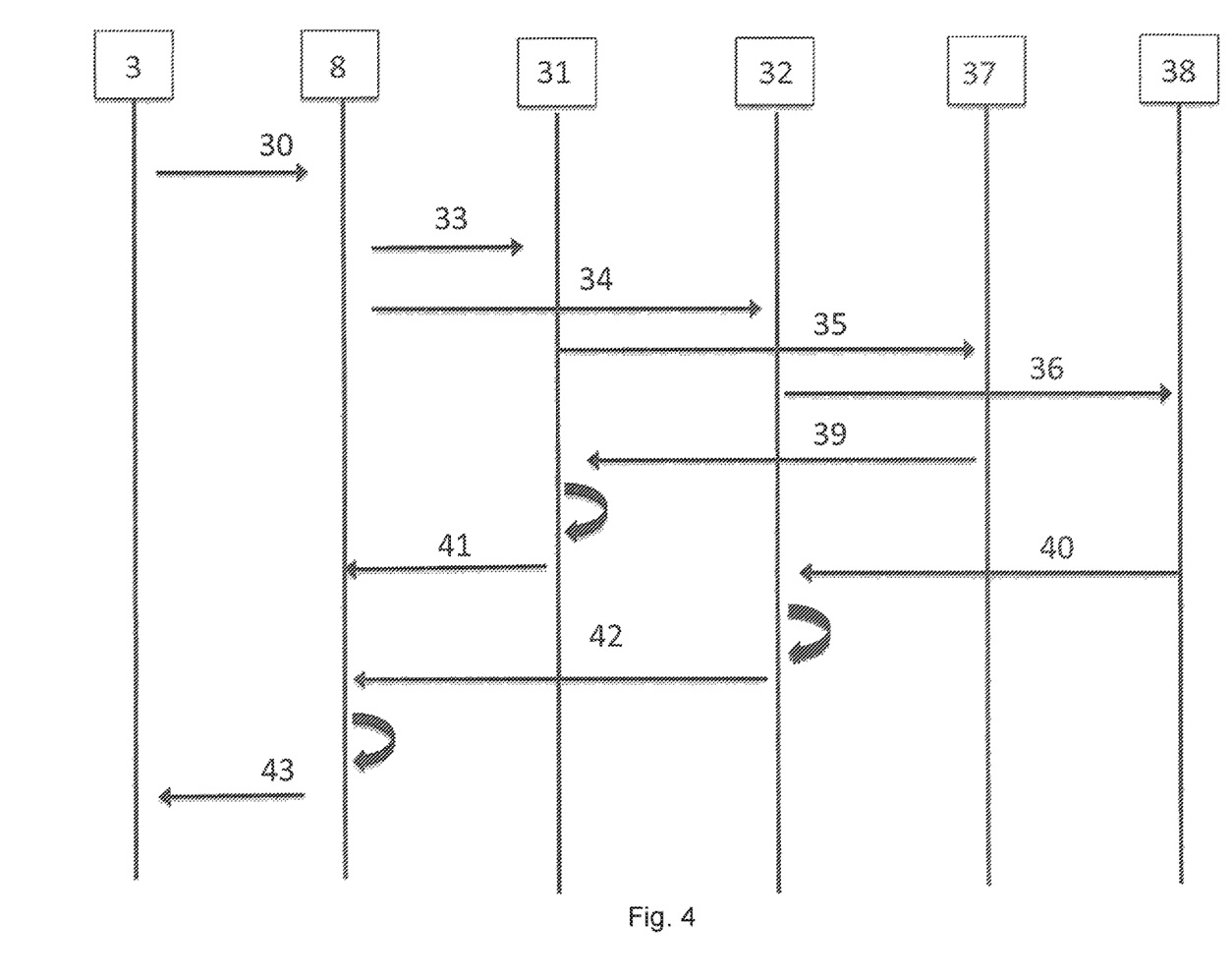
FIG. 4 shows a schematic sequence diagram for the process flow of an authentication in the use case represented in FIG. 3.

A further use case is schematically represented in FIG. 3, and the related process flow of the authentication is shown in FIG. 4. Here, a first user 28 initiates a transaction at an application terminal 29 (e.g. a cash machine or automatic teller machine). The application 3 running on the application terminal 29 recognizes by means of a user identification input by the first user 28 (e.g. a card number or account number) that an approval of the transaction via the authentication service 8 is required. Correspondingly, the application 3 transmits a query 30 comprising the identification data of the first user 28 to the authentication service 8. In the memory 9 of the authentication service 8, two different mobile terminals 31, 32 are linked with the identification data, and it is defined that an authentication is required at both terminals 31, 32. Therefore, the authentication service 8 transmits corresponding authentication requests 33, 34 to both terminals 31, 32, wherein the authentication service 8 is connected with the terminals 31, 32 via Internet connections, respectively. Thereupon, both terminals 31, 32 perform an enquiry 35, 36 of a biometric security feature of the respective user 37, 38 and, after an input 39, 40 is effected, possibly transmit signed transaction identifiers 41, 42 in a known manner back to the authentication service 8. The authentication service 8 transmits the confirmation 43 of the query 30 back to the application 3 only when transaction identifiers signed by all required mobile terminals 31, 32 and verified have been received.

Figure 5:
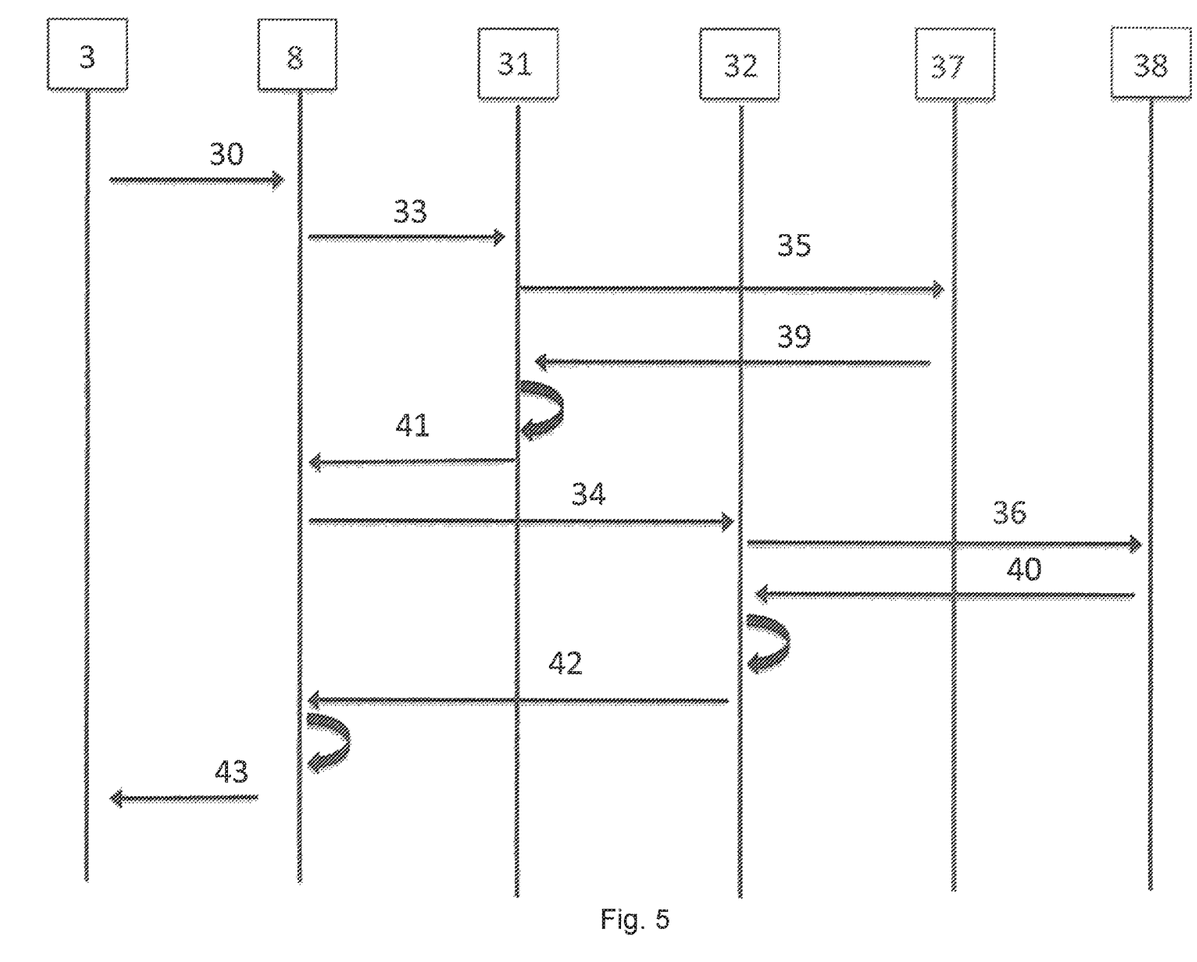
FIG. 5 shows an alternative schematic sequence diagram for the process flow of an authentication in the use case represented in FIG. 3.

An alternative process flow of the authentication with a predefined verification sequence is represented in FIG. 5, wherein for the individual method steps and method parties the same reference numerals as in FIG. 4 have been used. In order to avoid repetitions, therefore, with respect to the individual processes, reference is made to the above descriptions, wherein, in contrast to FIG. 4, the order of the steps 33, 34, 35, 36, 39, 40, 41, and 42 is a different one. In particular, the authentication request 34 will be transmitted to the second mobile terminal 32 only after the authentication service 8 detects and determines an authentically signed transaction identifier 41 and, thus, a successful authentication at the first mobile terminal 31. Thus, the order or sequence in which the two users 37, 38 of the mobile terminals 31, 32 have to authenticate themselves, is predefined in a fixed manner. The advantage of said method lies in the fact that, in case of a denial of the authentication by the first user 37, the second user 38 will not be bothered with a—in this case unnecessary—authentication request. In the method according to FIG. 4 a similar advantage can be obtained if in case of a denial of the authentication at one terminal 31, 32, the authentication request 34, 33 of the respective other or remaining terminals 32, 31 will be withdrawn automatically.

Within the scope of the method process flows and systems as described here, it lies of course within the discretion of the person skilled in the art to provide additional, general safety measures. This applies in particular to the data connections between the authentication service 8 and the mobile terminals 10, 31, 32, wherein, preferably, in case of a registration of a terminal, a two-way authentication between the terminal 10, 31, 32 and the authentication service 8 is established and a correspondingly encrypted communication will be used for all exchanged messages. Similar measures can also be provided between the application(s) 3 and the authentication service 8. In view of the dependence of the application 3 on the availability of the authentication service 8, principally also several redundant entities of the authentication service 8 or several authentication servers 7 can be provided.

The invention claimed is:

1. A method for authenticating a user, the method comprising:
   an application transmitting a query comprising identification data to an authentication service,
   the authentication service determines an address of a mobile terminal linked to the user by the identification data, generates a transaction identifier, and transmits a request comprising the generated transaction identifier to the mobile terminal,
   the mobile terminal performs an enquiry for input of a biometric security feature, grants access to a private key saved on the mobile terminal upon input of a valid security feature, signs the generated transaction identifier using the private key, and transmits the signed generated transaction identifier back to the authentication service, wherein the access to the private key is granted only after input of an authorized biometric security feature; and
   the authentication service performs an authentication, wherein the authentication comprises:
     verifying a signature of the signed generated transaction identifier, and
     transmitting a confirmation of the query back to the application in the case of a presence of an authentic signature;
   wherein the authentication service verifies the signed generated transaction identifier using a public key which is linked with the identification data.

2. The method according to claim 1, wherein the authentication service is connected with the mobile terminal via a mobile data connection.

3. The method according to claim 2, wherein the access to the private key is granted only after input of an authorized biometric security feature.

4. The method according to claim 1, wherein the authentication service signs the confirmation using a user-independent private key.

5. The method according to claim 4, wherein, together with the generated transaction identifier, a transaction characteristic modifiable at the mobile terminal by the user is transmitted, and, together with the signed generated transaction identifier, a corresponding transaction characteristic is transmitted.

6. The method according to claim 1, wherein, together with the generated transaction identifier, a transaction characteristic modifiable at the mobile terminal by the user is transmitted, and, together with the signed generated transaction identifier, a corresponding transaction characteristic is transmitted.

7. The method according to claim 6, wherein the corresponding transaction characteristic is modified.

8. The method according to claim 6, wherein the authentication service determines the addresses of at least two mobile terminals by the identification data and transmits a request comprising the generated transaction identifier to the at least two mobile terminals, wherein a confirmation of the query will only be transmitted to the application when an authentically signed generated transaction identifier has been received from all terminals.

9. The method according to claim 8, wherein the identification data comprises a user identifier registered by the user at the authentication service and wherein the user identifier is independent of the address of the mobile terminal.

10. The method according to claim 1, wherein the authentication service determines addresses of at least two mobile terminals on the basis of the identification data, generates a transaction identifier, and transmits a request comprising the generated transaction identifier to the at least two mobile terminals, wherein a confirmation of the query will only be transmitted to the application when an authentically signed generated transaction identifier has been received from all terminals.

11. The method according to claim 10, wherein the authentication service observes a verification sequence, wherein the generated transaction identifier authentically signed by a first mobile terminal is transmitted to a second mobile terminal, and wherein the confirmation of the query will only be transmitted when a generated transaction identifier authentically signed by all mobile terminals is present.

12. The method according to claim 11, wherein the identification data comprises a user identifier registered by the user at the authentication service and wherein the user identifier is independent of the address of the mobile terminal.

13. The method according to claim 1, wherein the identification data comprises a user identifier registered by the user at the authentication service and wherein the user identifier is independent of the address of the mobile terminal.

14. The method according to claim 1, wherein the authentication service transmits an erase instruction to the mobile terminal, and the mobile terminal permanently erases the private key upon receipt of the erase instruction.

15. The method according to claim 1, wherein the authentication service verifies the signed generated transaction identifier using a public key which is linked with the identification data.

16. The method of claim 1, wherein each transaction identifier is a unique transaction identifier.

17. A system for authenticating a user, comprising:
an authentication server which hosts an authentication service, and
a mobile terminal which is configured to communicate with the authentication server,
wherein the authentication server comprises a memory containing identification data for identification of the user, an address of the mobile terminal linked with the identification data, and generator means to generate a transaction identifier,
wherein the mobile terminal is configured to verify a biometric security feature and comprises a memory containing a private key protected by the biometric security feature,
wherein the mobile terminal is configured to perform an enquiry for input of the biometric security feature upon receipt of a request comprising the generated transaction identifier from the authentication service, to grant access to the private key upon input of an authorized security feature, to sign the generated transaction identifier using the private key, and to transmit the signed generated transaction identifier back to the authentication service, wherein the access to the private key is granted only after input of an authorized biometric security feature;
wherein the authentication service is configured to perform an authentication; and
wherein the authentication service verifies the signed generated transaction identifier using a public key which is linked with the identification data.

18. An initialization method comprising:
generating a private key at a mobile terminal, the private key coupled with a biometric security feature to be authorized, thereby initializing an authentication method for authenticating a user,
wherein the authentication method for authenticating the user comprises:
an application transmitting a query comprising identification data to an authentication service,
the authentication service determines an address of a mobile terminal linked to the user by the identification data, generates a transaction identifier, and transmits a request comprising the generated transaction identifier to the mobile terminal, wherein said mobile terminal has been initialized with the initialization method,
the mobile terminal performs an enquiry for input of a biometric security feature, grants access to a private key saved on the mobile terminal upon input of a valid security feature, signs the generated transaction identifier with a signature using the private key and transmits the signed generated transaction identifier back to the authentication service, wherein the access to the private key is granted only after input of an authorized biometric security feature;
the authentication service performs an authentication, wherein the authentication comprises:
verifying the signature of the signed generated transaction identifier and,
transmitting a confirmation of the query back to the application in the case of an authentic signature;
wherein the authentication service verifies the signed generated transaction identifier using a public key which is linked with the identification data.

* * * * *